United States Patent
Balkenende et al.

(10) Patent No.: US 8,923,999 B2
(45) Date of Patent: Dec. 30, 2014

(54) VOLUMETRIC CUT PLANNING

(75) Inventors: Theo Balkenende, Enschede (NL);
Hans Scheerder, Almelo (NL); Oliver Sing, La Habra Heights, CA (US); Tom van 't Erve, Enschede (NL)

(73) Assignee: Siemens Product Lifecycle Management Software Inc., Plano, TX (US)

( * ) Notice: Subject to any disclaimer, the term of this patent is extended or adjusted under 35 U.S.C. 154(b) by 466 days.

(21) Appl. No.: 13/226,595

(22) Filed: Sep. 7, 2011

(65) Prior Publication Data

US 2013/0060368 A1 Mar. 7, 2013

(51) Int. Cl.
*G05B 19/4097* (2006.01)
*G05B 19/4069* (2006.01)

(52) U.S. Cl.
CPC ........ *G05B 19/4069* (2013.01); *G05B 19/4097* (2013.01); *G05B 2219/35134* (2013.01); *G05B 2219/35159* (2013.01); *G05B 2219/36268* (2013.01); *G05B 2219/36299* (2013.01)
USPC ............................................ 700/98; 700/182

(58) Field of Classification Search
None
See application file for complete search history.

(56) References Cited

U.S. PATENT DOCUMENTS

| | | | | |
|---|---|---|---|---|
| 5,323,326 A * | 6/1994 | Saito et al. | | 700/182 |
| 5,351,196 A * | 9/1994 | Sowar et al. | | 700/98 |
| 5,828,574 A * | 10/1998 | Robinson et al. | | 700/173 |
| 6,212,441 B1 * | 4/2001 | Hazama et al. | | 700/98 |
| 6,507,806 B1 * | 1/2003 | Tandler | | 703/1 |
| 6,862,023 B1 * | 3/2005 | Shaikh | | 345/420 |
| 7,024,272 B2 * | 4/2006 | Thomas et al. | | 700/98 |
| 7,372,460 B2 * | 5/2008 | Usami et al. | | 345/419 |
| 7,412,296 B2 * | 8/2008 | Yamaguchi et al. | | 700/98 |
| 7,471,291 B2 * | 12/2008 | Kaufman et al. | | 345/424 |
| 7,826,684 B2 * | 11/2010 | Yu et al. | | 382/294 |
| 2002/0133264 A1 * | 9/2002 | Maiteh et al. | | 700/182 |
| 2003/0083773 A1 * | 5/2003 | Schwanecke et al. | | 700/182 |
| 2003/0114945 A1 * | 6/2003 | Hirano et al. | | 700/97 |
| 2004/0186614 A1 * | 9/2004 | Yamaguchi et al. | | 700/179 |
| 2006/0106485 A1 * | 5/2006 | Landers et al. | | 700/98 |

(Continued)

FOREIGN PATENT DOCUMENTS

| | | |
|---|---|---|
| EP | 1087277 A2 | 3/2001 |
| EP | 2048558 A1 | 4/2009 |
| FR | 2931956 A1 | 12/2009 |
| WO | WO 2010136368 A1 * | 12/2010 |

OTHER PUBLICATIONS

PCT International Search Report mailed Jan. 4, 2013 in connection with PCT International Application No. PCT/US2012/054140; 5 pages.

(Continued)

*Primary Examiner* — Ryan Jarrett

(57) ABSTRACT

Methods for computer-aided manufacturing and design, and corresponding systems and computer-readable mediums. A method includes receiving a three-dimensional (3D) solid part model and an associated 3D solid blank. The method includes defining an initial in-process workpiece (IPW) as the same as the 3D solid blank, and defining a cut volume in-process feature to be removed from the IPW. The method includes removing the cut volume in-process feature from the IPW. The method can include calculating and storing the cut volume in-process feature or the updated IPW with the removed cut volume in-process feature. The updated in-process workpiece can be calculated and displayed for each state at all times, in various embodiments.

15 Claims, 6 Drawing Sheets

(56) References Cited

U.S. PATENT DOCUMENTS

| | | | |
|---|---|---|---|
| 2007/0250198 A1* | 10/2007 | Red et al. | 700/97 |
| 2009/0228130 A1* | 9/2009 | Fujino et al. | 700/103 |
| 2010/0063616 A1* | 3/2010 | Mori et al. | 700/160 |
| 2010/0152872 A1* | 6/2010 | Dunne et al. | 700/98 |
| 2010/0292822 A1* | 11/2010 | Hahn | 700/98 |
| 2011/0009993 A1 | 1/2011 | Chuang et al. | |
| 2011/0077769 A1 | 3/2011 | Matsubara et al. | |
| 2011/0160888 A1* | 6/2011 | Pietsch et al. | 700/98 |
| 2013/0262065 A1* | 10/2013 | Erdim et al. | 703/7 |

OTHER PUBLICATIONS

Written Opinion of the International Searching Authority dated Jan. 4, 2013 in connection with International Application No. PCT/US2012/054140; 6 pages.

Lee, et al; "Using virtual boundaries for the planning and machining of protrusion free-form features" Computers in Industry, Elsevier Science Publishers, Dec. 1994; 14pg.

* cited by examiner

VOLUMETRIC CUT PLANNING

TECHNICAL FIELD

The present disclosure is directed, in general, to computer-aided design (CAD), visualization, and manufacturing systems, and other systems (collectively, "computer aided manufacturing" systems or CAM systems).

BACKGROUND OF THE DISCLOSURE

CAM systems are used for designing and manufacturing products, among other uses. Improved systems are desirable.

SUMMARY OF THE DISCLOSURE

Various disclosed embodiments include methods for computer-aided manufacturing and design, and corresponding systems and computer-readable mediums. A method includes receiving a three-dimensional (3D) solid part model and an associated 3D solid blank. The method includes defining an initial in-process workpiece (IPW) to be the same as the 3D solid blank, and defining a cut volume in-process feature to be removed from the IPW. The method includes removing the cut volume in-process feature from the IPW. The method can include calculating and storing the cut volume in-process feature or the updated IPW with the removed cut volume in-process feature. The updated in-process workpiece can be calculated and displayed for each state at all times, in various embodiments.

The foregoing has outlined rather broadly the features and technical advantages of the present disclosure so that those skilled in the art may better understand the detailed description that follows. Additional features and advantages of the disclosure will be described hereinafter that form the subject of the claims. Those skilled in the art will appreciate that they may readily use the conception and the specific embodiment disclosed as a basis for modifying or designing other structures for carrying out the same purposes of the present disclosure. Those skilled in the art will also realize that such equivalent constructions do not depart from the spirit and scope of the disclosure in its broadest form.

Before undertaking the DETAILED DESCRIPTION below, it may be advantageous to set forth definitions of certain words or phrases used throughout this patent document: the terms "include" and "comprise," as well as derivatives thereof, mean inclusion without limitation; the term "or" is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, whether such a device is implemented in hardware, firmware, software, or some combination of at least two of the same. It should be noted that the functionality associated with any particular controller may he centralized or distributed, whether locally or remotely. Definitions for certain words and phrases are provided throughout this patent document, and those of ordinary skill in the art will understand that such definitions apply in many, if not most, instances to prior as well as future uses of such defined words and phrases. While some terms may include a wide variety of embodiments, the appended claims may expressly limit these terms to specific embodiments.

BRIEF DESCRIPTION OF THE DRAWINGS

For a more complete understanding of the present disclosure, and the advantages thereof, reference is now made to the following descriptions taken in conjunction with the accompanying drawings, wherein like numbers designate like objects, and in which.

DETAILED DESCRIPTION

Figure 1:
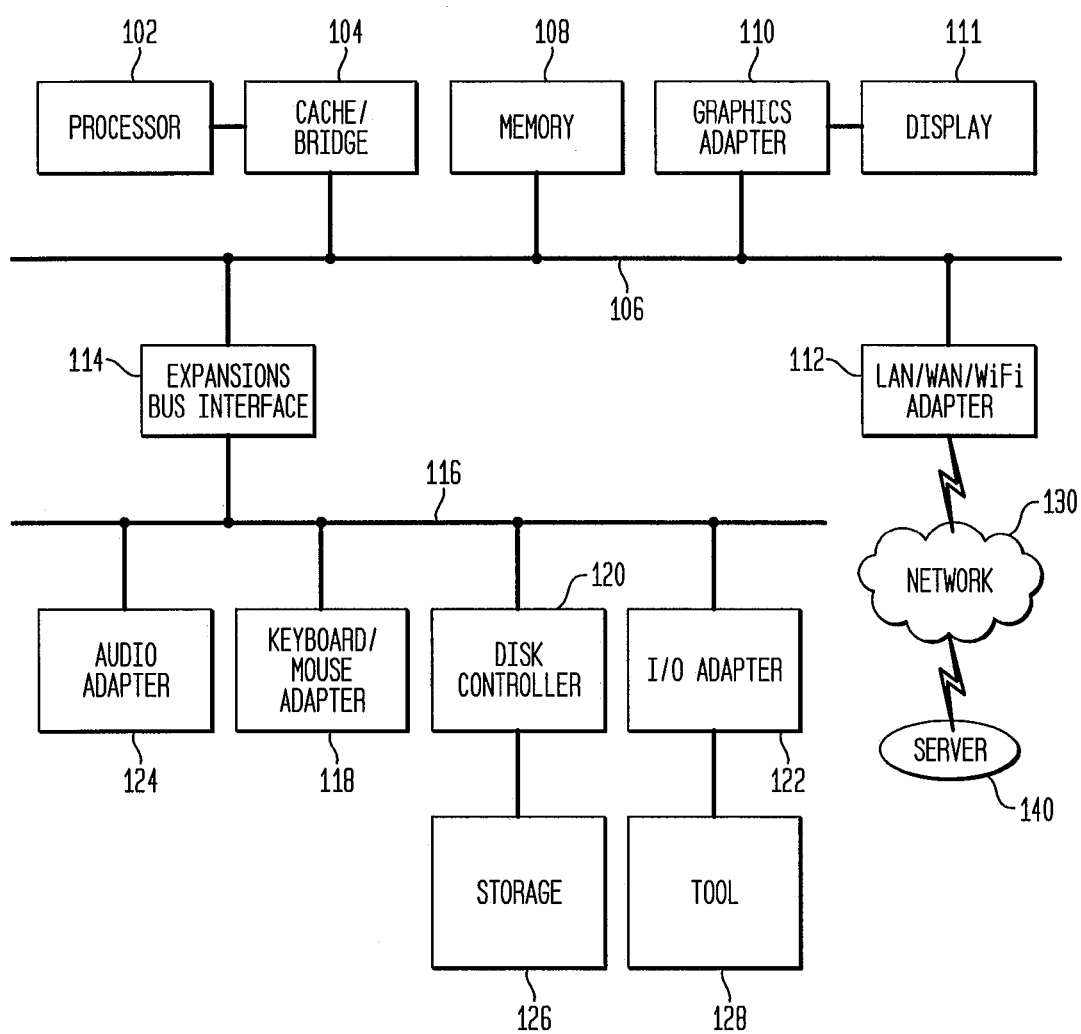
FIG. 1 depicts a block diagram of a data processing system in which an embodiment can be implemented.

FIGS. 1 through 5, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged device. The numerous innovative teachings of the present application will be described with reference to exemplary non-limiting embodiments.

Various embodiments disclosed herein enable users and systems to determine the number of CAM setups and plan the detailed CAM operations needed to machine a component by decomposing and sequencing the to-be-machined material into "cut volumes."

An "in-process workpiece" (IPW), as used herein, is a piece of material that is undergoing a machining or other manufacturing operation, whether physical or simulated. To properly plan and execute a CAM operation, it is important to be able to determine the status of the IPW before and after each operation, and the IPW refers to the intermediate state of the workpiece between two operations. As used herein, the term IPW refers to the three-dimensional (3D) geometry of the workpiece. A cut volume of a machining feature is the volumetric shape to be removed in the context of the part model, and a cut volume of an in-process feature is volume removed by an operation in the context of the IPW. A machining feature has one or more in-process features, one for each operation that is needed to machine the machining feature.

In conventional CAM systems, IPW models can only be determined after CAM operations have been fully defined and tool paths have been generated.

In conventional systems, during the initial setup and operation planning stage, the CAM operations don't exist yet so there is no IPW that can be used to help define the volumetric containment of an operation. The user is expected to imagine the IPW and define the appropriate volumetric containment by defining 2D boundaries or faces. These boundaries depend on material that has been removed by previous operations. The user needs an up-to-date IPW at all times in order to be able to specify the appropriate volumetric containment of his operations. This places users in a difficult situation, since to define operations, users need an up-to-date IPW but an IPW can only be determined once you have fully defined previous operations.

Disclosed embodiments provide improved systems and methods for setup, process planning, and numerically-controlled (NC) programming of prismatic and other parts.

Setup and process planning is typically separated from NC programming. Process Planners typically use an enterprise resource planning (ERP) system to define a pure textual description of the number of setups and the type of operations per setup. Defining the detailed operation plan is left to the NC programmer who uses a CAM system to define a single sequential set of operations.

The volumetric containment of an operation is typically defined manually using 2D boundaries and faces, which can make it a very time consuming activity. Re-ordering such operations can require extensive modifications to the volumetric containment. Such changes have to be made manually by the NC programmer who has to visualize the 3D state of the IPW before and after each operation in his head. Re-ordering the new cut volume based operations will automatically update the volumetric containment and IPW. As a consequence, it will be much easier to optimize the operation sequence.

Traditionally, NC programmers only see the input geometry (faces and/or boundaries) of an operation and a large series of operation parameters. Modifications to some of these operation parameters results in changes to the volumetric containment that are not visualized. The only feedback to the user is the resulting tool path which may or may not remove the volume that the user intended to cut.

Disclosed embodiments allow users to easily define CAM operations that reference IPW-aware 3D solid cut volumes as their volumetric containment and don't require manual definition of two-dimensional (2D) boundaries. Disclosed embodiments support both 3D visualization and editing of the inferred cut volumes to provide maximum user control over the to-be-machined volumes. Various embodiments provide operation re-ordering capabilities that automatically update both the 3D solid cut volumes and the operation's volumetric containment which enables process optimization without adding significant additional efforts.

Disclosed embodiments provide distinct technical advantages. CAM operations can reference 3D solid cut volumes instead of model faces and/or 2D boundaries. The cut volumes are IPW aware and much easier to define. These cut volumes and the IPW automatically also adapt to changes that are caused by a re-ordering of the operations.

Further, disclosed embodiments can visualize the explicit 3D cut volumes. This provides a very visual planning experience and results in a significant reduction of the time needed to perform multi-side setup planning and optimization and NC programming.

FIG. 1 depicts a block diagram of a data processing system in which an embodiment can be implemented, for example as a CAM system particularly configured by software or otherwise to perform the processes as described herein, and in particular as each one of a plurality of interconnected and communicating systems as described herein. The data processing system depicted includes a processor 102 connected to a level two cache/bridge 104, which is connected in turn to a local system bus 106. Local system bus 106 may be, for example, a peripheral component interconnect (PCI) architecture bus. Also connected to local system bus in the depicted example are a main memory 108 and a graphics adapter 110. The graphics adapter 110 may be connected to display 111.

Other peripherals, such as local area network (LAN)/Wide Area Network/Wireless (e.g. WiFi) adapter 112, may also be connected to local system bus 106. Expansion bus interface 114 connects local system bus 106 to input/output (I/O) bus 116. I/O bus 116 is connected to keyboard/mouse adapter 118, disk controller 120, and I/O adapter 122. Disk controller 120 can be connected to a storage 126, which can be any suitable machine usable or machine readable storage medium, including but not limited to nonvolatile, hard-coded type mediums such as read only memories (ROMs) or erasable, electrically programmable read only memories (EEPROMs), magnetic tape storage, and user-recordable type mediums such as floppy disks, hard disk drives and compact disk read only memories (CD-ROMs) or digital versatile disks (DVDs), and other known optical, electrical, or magnetic storage devices.

I/O adapter 122 can be connected to control one or more tools 128, which can be NC machines or other machine tools, in particular those configured to perform machining operations on a workpiece as described herein.

Also connected to I/O bus 116 in the example shown is audio adapter 124, to which speakers (not shown) may be connected for playing sounds. Keyboard/mouse adapter 118 provides a connection for a pointing device (not shown), such as a mouse, trackball, trackpointer, etc.

Those of ordinary skill in the art will appreciate that the hardware depicted in FIG. 1 may vary for particular implementations. For example, other peripheral devices, such as an optical disk drive and the like, also may be used in addition or in place of the hardware depicted. The depicted example is provided for the purpose of explanation only and is not meant to imply architectural limitations with respect to the present disclosure.

A data processing system in accordance with an embodiment of the present disclosure includes an operating system employing a graphical user interface. The operating system permits multiple display windows to be presented in the graphical user interface simultaneously, with each display window providing an interface to a different application or to a different instance of the same application. A cursor in the graphical user interface may be manipulated by a user through the pointing device. The position of the cursor may be changed and/or an event, such as clicking a mouse button, generated to actuate a desired response.

One of various commercial operating systems, such as a version of Microsoft Windows™, a product of Microsoft Corporation located in Redmond, Wash. may be employed if suitably modified. The operating system is modified or created in accordance with the present disclosure as described.

LAN/WAN/Wireless adapter 112 can be connected to a network 130 (not a part of data processing system 100), which can be any public or private data processing system network or combination of networks, as known to those of skill in the art, including the Internet. Data processing system 100 can communicate over network 130 with server system 140, which is also not part of data processing system 100, but can be implemented, for example, as a separate data processing system 100.

A machining feature, in general, is a volume in the workpiece where material should be removed. In some embodiments, machining features are represented as a set of geometric entities, such as faces, and a set of parameters describing characteristics, e.g., surface roughness, and shape, e.g., width and height, of the feature. A machining feature is machined by one or more operations, such as a roughing and a finishing operation, among others.

A feature can be machined by one or more operations until its final shape is reached. The shape machined by one of these operations can be considered a machining feature itself. Such an intermediate feature is called an "in-process feature" herein. For each operation performed on a machining feature an in-process feature is created. The in-process feature, in various embodiments, is connected to exactly one operation.

Figure 2:
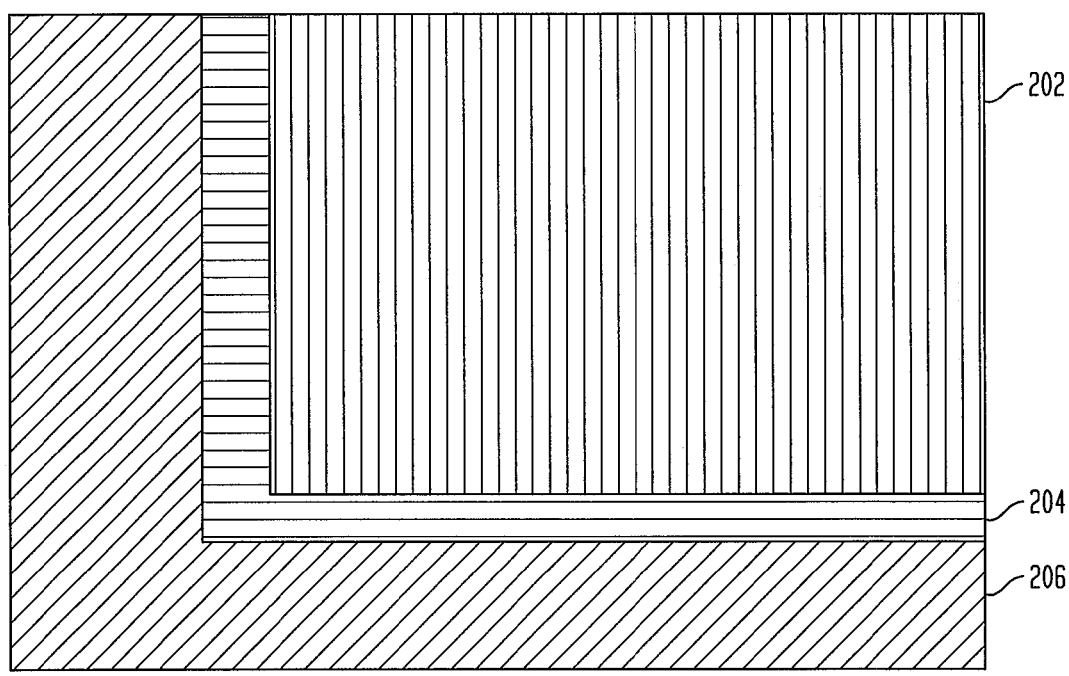
FIG. 2 illustrates in-process features, in a cross-section view of a block workpiece.

FIG. 2 illustrates in-process features, in a cross-section view of a block workpiece. In this case, workpiece 200 is being machined to have a corner notch first using a roughing process then using a finishing process. These operations are illustrated using a roughing in-process feature 202, which shows the cut volume to be removed by the roughing process, and a finishing in-process feature 204, which shows the cut volume to be removed by the finishing process. The remaining area 206 of workpiece 200, i.e., the IPW after performing the roughing and finishing operations, will have the corner notch. The corner notch is created using a finishing and a roughing operation so that a roughing corner notch in-process feature and a finishing corner notch in-process feature is created.

Each feature, including machining features and in-process features, has a corresponding volume of material that must be removed in order to produce the feature. For a machining feature, the cut volume represents a volume in the context of the part model that must be removed, and is the volume that the user intends to cut with the operations connected with the feature. For an in-process feature, the cut volume represents a volume in the context of the IPW model that must be removed, and is derived from part geometry exactly like the cut volume from the connected machining feature but taking into account face offsets in respect to the IPW.

For manufacturing, it is more relevant to view feature volumes in the context of the workpiece from which the feature volumes are cut by an operation. The geometric shape of the workpiece (the IPW) is an intermediate state between the initial workpiece (the blank) and the final workpiece (the part model), and represents the state between two operations. In the end the IPW, calculated by subtracting the cut volumes of all the in-process features from the blank, will be identical to the part model.

Figure 3:
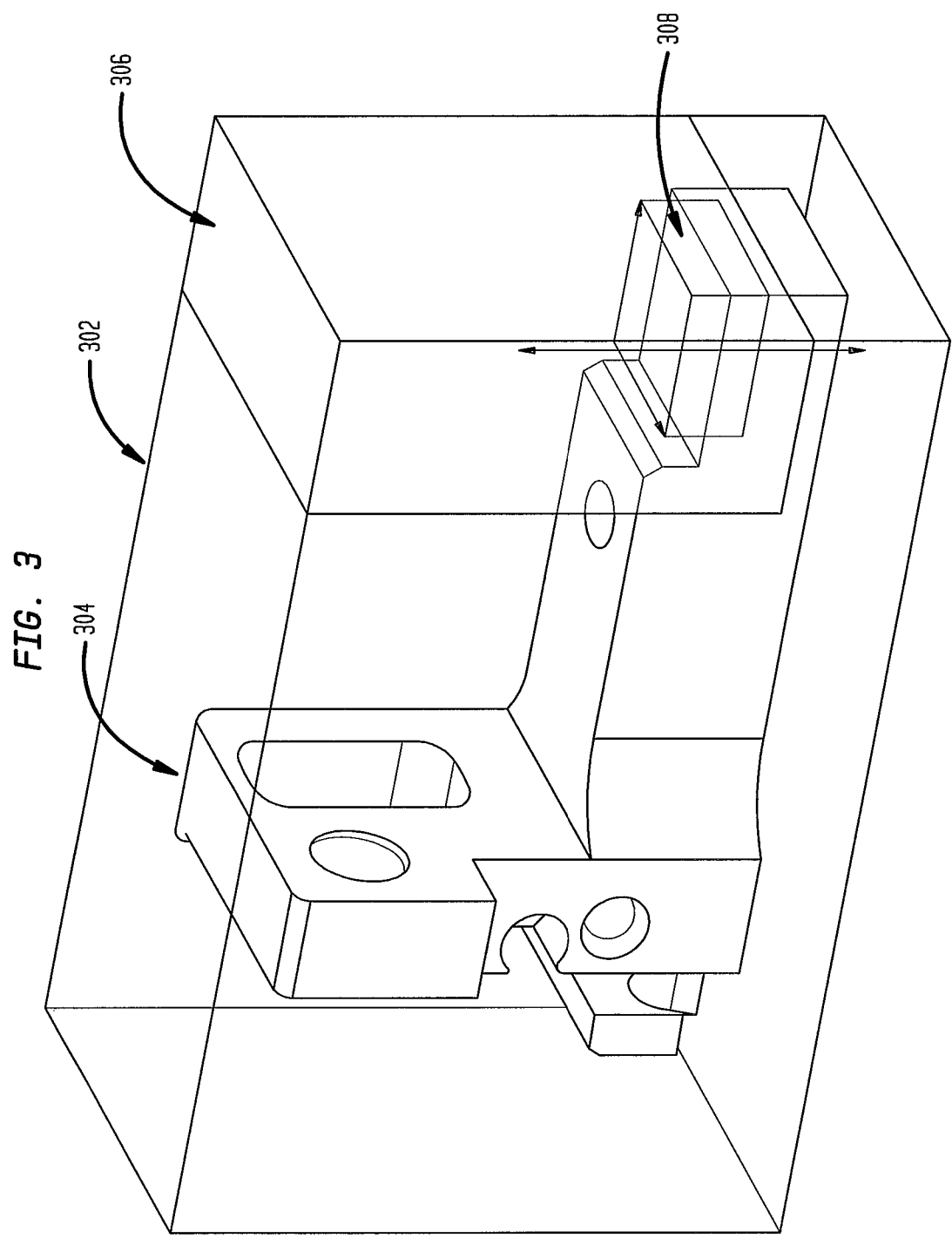
FIG. 3 illustrates a corner notch cut volume in context of the in-process workpiece.

FIG. 3 illustrates a corner notch cut volume in context of the IPW. Here, the initial blank 302 is shown, as well as the part 304 to be eventually produced from the workpiece. The cut volume in-process feature 306 illustrates the volume to be removed from the workpiece in the context of the IPW. The cut volume machining feature 308 illustrates the volume to be removed in the context of the part.

In many cases, the machining feature volume is the same as the sum of the cut volumes of its in-process features. However, this is not necessarily true, since calculating a volume in the context of the IPW might result in different volumes, as in the example of FIG. 3.

According to various disclosed embodiments, the user generally starts with a simple solid block such as blank 302 and defines or selects the cut volumes to be removed with each operation to subtract features like holes, slots, pockets etc. Each in-process feature changes the IPW by subtracting its cut volume from the IPW. These cut volumes can be created by the user manually and received by the system, or the system can use the cut volumes of features that result from feature recognition. The (output) IPW created by a previous in-process feature, will be used as input IPW for the calculation of the next in-process feature.

This process means that the IPW is modified with each operation by subtracting the in-process feature volumes from the IPW, where the first state of the IPW is generally the blank. This results in a new IPW for the next operation. The IPW is thus updated automatically after a new operation has been defined. This is similar to a part being updated after a new CAD feature has been defined.

Figure 4A:
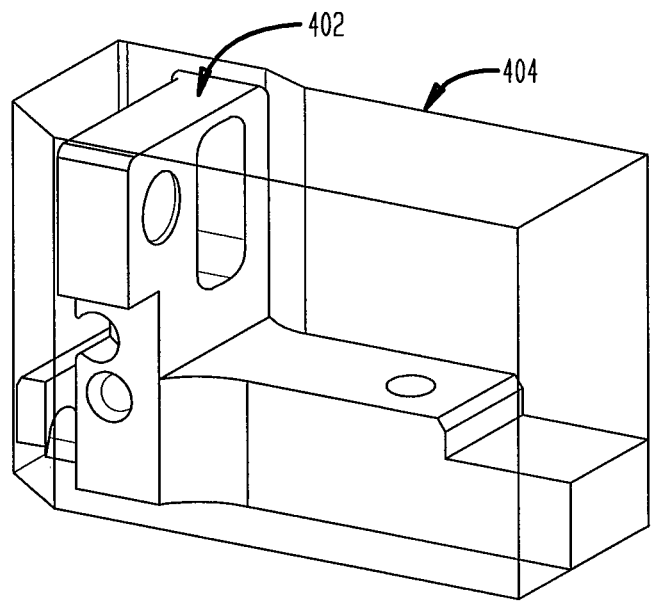
FIGS. 4A-4D illustrate cut-volume removal in accordance with disclosed embodiments.

FIGS. 4A-4D illustrate cut-volume removal in accordance with disclosed embodiments. In FIG. 4A, an original blank 404 is shown surrounding the part 402 that is to be created.

Figure 4B:
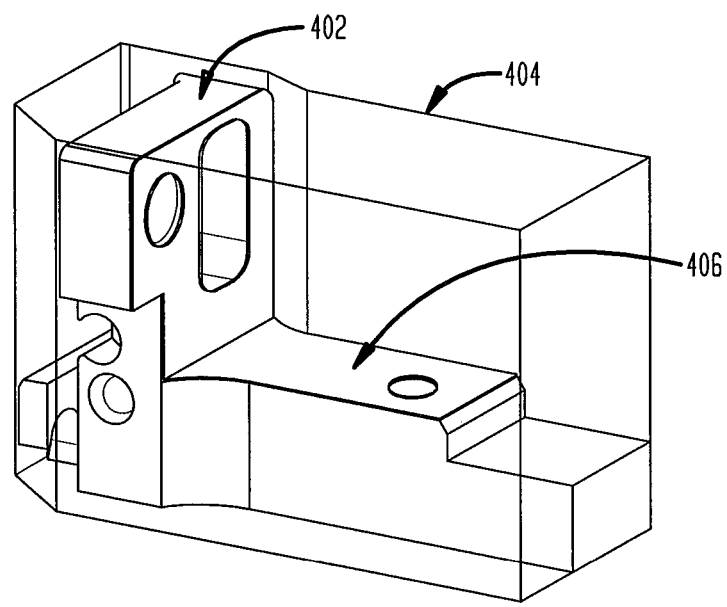

FIG. 4B illustrates the system receiving a selection of a cut volume feature to be removed. In this case, the system has received a selection of one feature 406 defined by two faces of the part 402, one side thee and one upper face, that define boundaries of the cut volume feature. In this case, the system can use a rule to determine that the other boundaries of the cut volume feature should be determined by projecting the selected part features to the boundaries of the current IPW.

Figure 4C:
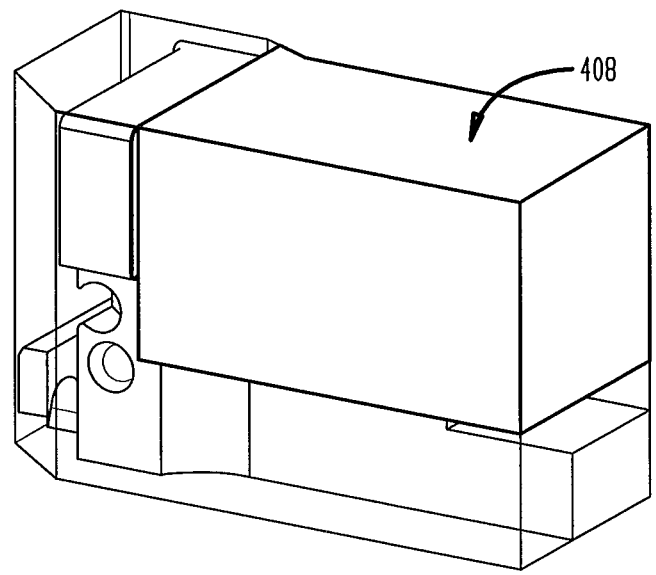

FIG. 4C illustrates the cut volume in-process feature 408 to be removed from the blank.

Figure 4D:
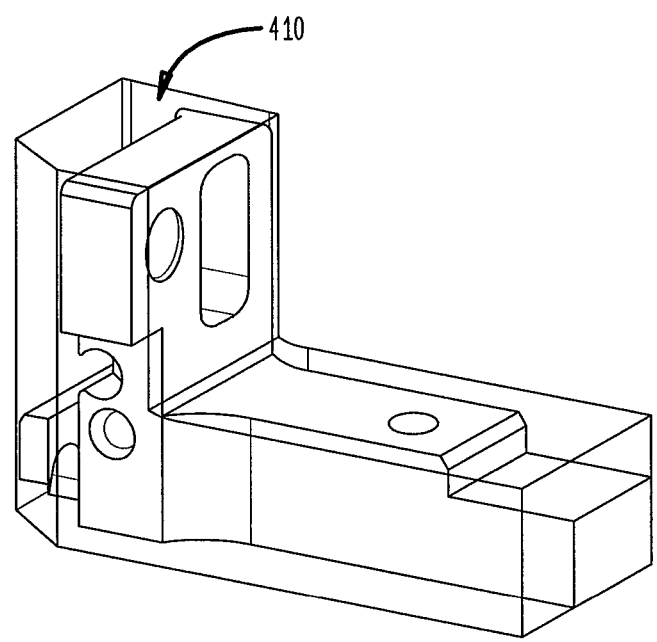

FIG. 4D illustrates the resulting in-process workpiece 410 after removal of the in-process feature. The system can designate the output in-process workpiece 410 as the input IPW for any following series of operations, including for performing another cut-volume removal process using the IPW 410 as the starting blank. The "blank" is the initial IPW and is the target for all cut volume changes.

In various embodiments, the user can change the cut volumes once they have been created. When the cut volume does not exactly represent the intention of the user he is able to edit the volume just like a normal CAD feature.

Once a series of operations have been created it is possible the user wants to change the sequence of the operations for whatever reason. Moving operations will recalculate all cut volumes for operations that followed the moved operation and in turn change the IPW for each consecutive operation. The consequence is that the IPW is update-to-date at all times.

Note that in various embodiments, the cut volumes simply reflect the intended volumes the user wants to remove. The actual (exact) volume that will be removed can depend on other operation parameters as well, and can generally only be determined after the exact tool path has been calculated. In an ideal situation, both volumes will be exactly the same. Differences between them can be used to inform the user that the result is not what he intended.

Figure 5:
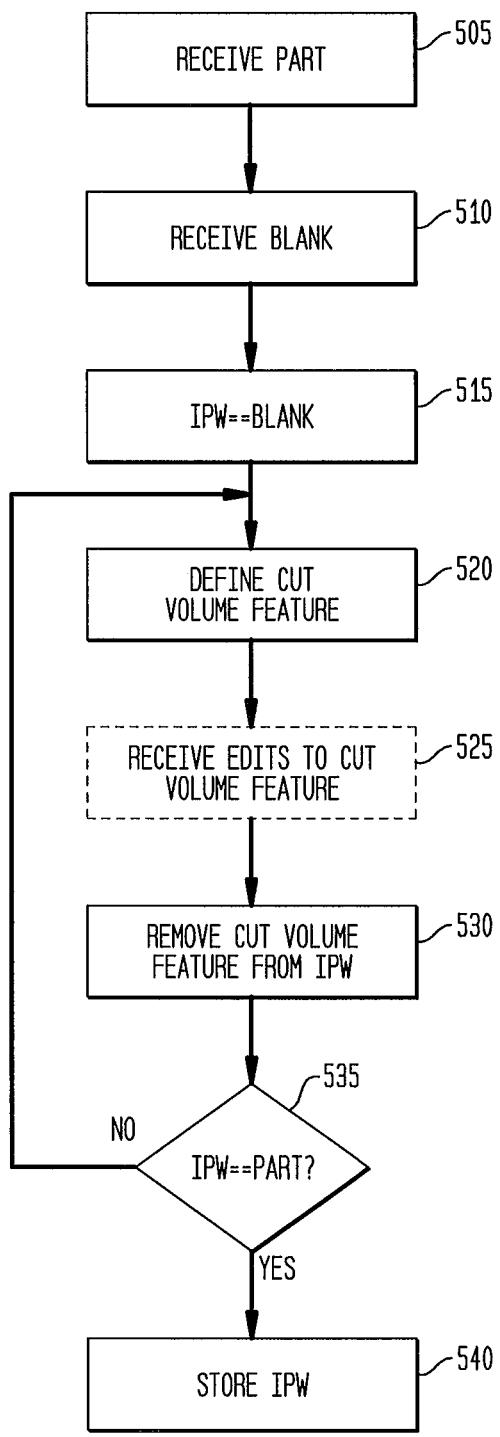
FIG. 5 depicts a flowchart of a process in accordance with disclosed embodiments.

FIG. 5 depicts a flowchart of a process in accordance with disclosed embodiments that may be performed, for example, by a CAM, CAD, or product lifecycle manaments (PLM) system, or multiple systems acting together.

The system receives a 3D solid part model (step 505). This can be a 3D CAD model. Receiving, as used herein, can include loading from storage, receiving from another system or process, receiving via an interaction with a user, or otherwise. The received workpiece can be, in some implementations, an in-process workpiece (IPW) from a previous process.

The system receives a 3D solid blank (step 510), associated with the 3D solid part model.

The system can define the initial IPW to be the 3D solid blank (step 515).

The system defines a cut volume in-process feature to be removed from the IPW (step 520). This step can include receiving a selection of part model faces such as floor and wall faces, and determining cut volumes from the selected faces. In other embodiments, this step can include the system receiving a user selection of machining features of the part model. This step can include the system projecting or extending the open faces of cut volume feature or any selected features to one or more boundaries or faces of the workpiece, "open face" are faces that do not collide with the IPW. As part of this step, the system can use the faces of the 3D solid part model, or any other features of the model, to calculate the cut volume in context of the part model. The system can also perform any required analysis to adjust faces that need to be calculated in context of the IPW for the in-process feature.

Defining a cut volume in-process feature can include defining computer-aided manufacturing (CAM) operations to remove a cut volume from a physical workpiece that corresponds to the cut volume in-process feature.

The system can optionally receive edits or other manipulation to the cut volume feature (step 525).

The system calculates an updated IPW by removing the cut volume in-process feature from the previous IPW (step 530). This step can include storing the updated IPW or displaying the updated IPW to a user.

If the updated IPW is not yet the same as the 3D solid part model, the system can repeat the process at step 520, using the updated IPW as the 3D solid blank (step 535).

The system can store the updated IPW or the cut volume of the in-process feature (step 540). The system can use the stored cut volume of the in-process feature to recalculate and display the IPW on the fly. The process is finished if the IPW is identical to the part model since there are no more cut volumes that require machining. The updated IPW can be used as the 3D solid blank in a subsequent operation, even if the process did not repeat at step 535, or the cut-volume of the in-process feature can be used to recalculate the IPW for use in a subsequent operation.

The system can also perform other operations, such as defining CAM sequencing operations for the IPW. The system can allow re-sequencing of the CAM operations, and automatically update the cut volumes and the 3D solid IPW for each operation. The system can ensure that the cut volumes update associatively to part and/or blank model changes. The system can use the cut volumes to define the volumetric containment for the 2.5D volume-based milling operations.

Note that "storing," as used herein, does not necessarily require committing the stored element to permanent, semi-permanent, or non-volatile storage. "Storing" can also include temporary storage in memory for only as long as required to calculate, display, or manipulate the stored element, whether or not the stored element is subsequently discarded when no longer needed.

Of course, those of skill in the art will recognize that, unless specifically indicated or required by the sequence of operations, certain steps in the processes described above may be omitted, performed concurrently or sequentially, or performed in a different order.

Those skilled in the art will recognize that, for simplicity and clarity, the full structure and operation of all data processing systems suitable for use with the present disclosure is not being depicted or described herein. Instead, only so much of a data processing system as is unique to the present disclosure or necessary for an understanding of the present disclosure is depicted and described. The remainder of the construction and operation of data processing system 100 may conform to any of the various current implementations and practices known in the art.

It is important to note that while the disclosure includes a description in the context of a fully functional system, those skilled in the art will appreciate that at least portions of the mechanism of the present disclosure are capable of being distributed in the form of instructions contained within a machine-usable, computer-usable, or computer-readable medium in any of a variety of forms, and that the present disclosure applies equally regardless of the particular type of instruction or signal bearing medium or storage medium utilized to actually carry out the distribution. Examples of machine usable/readable or computer usable/readable mediums include: nonvolatile, hard-coded type mediums such as read only memories (ROMs) or erasable, electrically programmable read only memories (EEPROMs), and user-recordable type mediums such as floppy disks, hard disk drives and compact disk read only memories (CD-ROMs) or digital versatile disks (DVDs). Various embodiments can include computer-executable instructions stored in transitory or non-transitory media that, when executed, cause one or more data processing systems to perform actions as described herein.

Although an exemplary embodiment of the present disclosure has been described in detail, those skilled in the art will understand that various changes, substitutions, variations, and improvements disclosed herein may be made without departing from the spirit and scope of the disclosure in its broadest form.

None of the description in the present application should be read as implying that any particular element, step, or function is an essential element which must be included in the claim scope: the scope of patented subject matter is defined only by the allowed claims. Moreover, none of these claims are intended to invoke paragraph six of 35 USC §112 unless the exact words "means for" are followed by a participle.

What is claimed is:

1. A method performed by a data processing system and comprising:
    receiving a three-dimensional (3D) solid part model and an associated 3D solid blank;
    defining an initial in-process workpiece (IPW) to be the same as the 3D solid blank;
    defining a cut volume in-process feature to be removed from the IPW, including receiving a user section selection of features of the part model, automatically extending open faces of the selected features of the part model to one or more boundaries or faces of the workpiece, and determining the cut volume in-process feature from the selected features and the extended open faces;
    calculating an updated IPW by removing the cut volume in-process feature from the IPW; and
    storing the updated IPW with the removed cut volume in-process feature in the data processing system.

2. The method of claim 1, wherein defining a cut volume in-process feature includes defining computer-aided manufacturing (CAM) operations to remove a cut volume from a physical workpiece that corresponds to the cut volume in-process feature.

3. The method of claim 1, wherein defining a cut volume feature includes receiving a user selection of the cut volume feature.

4. The method of claim 1, wherein the system displays the updated IPW to a user.

5. The method of claim 1, wherein the updated IPW is used as the 3D solid blank in a subsequent operation.

6. A data processing system comprising:
    a processor; and
    an accessible memory, the data processing system particularly configured to
        receive a three-dimensional (3D) solid part model and an associated 3D solid blank;
        define an initial in-process workpiece (IPW) to be the same as the 3D solid blank;
        define a cut volume in-process feature to be removed from the IPW, including receiving a user section selection of features of the part model, automatically extending open faces of the selected features of the part model to one or more boundaries or faces of the workpiece, and determining the cut volume in-process feature from the selected features and the extended open faces;
        calculate an updated IPW by removing the cut volume in-process feature from the IPW; and store the updated IPW with the removed cut volume in-process feature in the data processing system.

7. The data processing system of claim 6, wherein defining a cut volume in-process feature includes defining computer-aided manufacturing (CAM) operations to remove a cut volume from a physical workpiece that corresponds to the cut volume in-process feature.

8. The data processing system of claim 6, wherein defining a cut volume feature includes receiving a user selection of the cut volume feature.

9. The data processing system of claim 6, wherein the system displays the updated IPW to a user.

10. The data processing system of claim 6, wherein the updated IPW is used as the 3D solid blank in a subsequent operation.

11. A non-transitory computer-readable medium encoded with executable instructions that, when executed, cause one or more data processing systems to:
receive a three-dimensional (3D) solid part model and an associated 3D solid blank;
define an initial in-process workpiece (IPW) to be the same as the 3D solid blank;
define a cut volume in-process feature to be removed from the IPW, including receiving a user section selection of features of the part model, automatically extending open faces of the selected features of the part model to one or more boundaries or faces of the workpiece, and determining the cut volume in-process feature from the selected features and the extended open faces;
calculate an updated IPW by removing the cut volume in-process feature from the IPW; and
store the updated IPW with the removed cut volume in-process feature in the data processing system.

12. The non-transitory computer-readable medium of claim 11, wherein defining a cut volume in-process feature includes defining computer-aided manufacturing (CAM) operations to remove a cut volume from a physical workpiece that corresponds to the cut volume in-process feature.

13. The non-transitory computer-readable medium of claim 11, wherein defining a cut volume feature includes receiving a user selection of the cut volume feature.

14. The non-transitory computer-readable medium of claim 11, wherein the system displays the updated IPW to a user.

15. The non-transitory computer-readable medium of claim 11, wherein the IPW is used as the 3D solid workpiece in a subsequent operation.

\* \* \* \* \*